United States Patent [19]

Urui

[11] 4,046,966
[45] Sept. 6, 1977

[54] CONFERENCE TRUNK CIRCUIT FOR AN EXCHANGE

[75] Inventor: Kiyoshi Urui, Tokyo, Japan

[73] Assignee: Tokyo Shibaura Electric Co., Ltd., Japan

[21] Appl. No.: 759,726

[22] Filed: Jan. 17, 1977

Related U.S. Application Data

[63] Continuation-in-part of Ser. No. 568,248, April 15, 1975, abandoned.

[30] Foreign Application Priority Data

Apr. 15, 1974 Japan .................................. 49-40943

[51] Int. Cl.² ........................................... H04M 3/56
[52] U.S. Cl. .......................... 179/18 BC; 179/18 AH
[58] Field of Search ........... 179/18 BC, 18 AH, 1 CN

[56] References Cited

U.S. PATENT DOCUMENTS 3,497,631  2/1970  Pearce et al. .................... 179/18 BC
3,515,807  6/1970  Clark ............................... 179/18 BC
3,903,373  9/1975  Gueldenpfennig et al. ..... 179/18 BC Primary Examiner—Thomas W. Brown
Attorney, Agent, or Firm—Oblon, Fisher, Spivak, McClelland & Maier

[57] ABSTRACT

There are disclosed first and second groups of internal office trunks used for an exchange. Each internal office trunk comprises first and second terminals for connecting two subscribers' telephones through a switching matrix circuit according to a demand signal from a central controller. The internal office trunks of the second group respectively further comprise a third terminal. The third terminal is connected to a switching circuit controlled by the central controller. The switching circuit controls a mutual connection of the internal office trunk circuits. As a result of being connected to the third terminal mutually by the switching circuit, the second group of the internal office trunks operates as a conference trunk.

3 Claims, 10 Drawing Figures

CONFERENCE TRUNK CIRCUIT FOR AN EXCHANGE

CROSS-REFERENCE TO RELATED APPLICATIONS

This is a continuation-in-part of application Ser. No. 568,248 filed Apr. 15, 1975, now abandoned.

BACKGROUND OF THE INVENTION

1. Field of the Invention

This invention relates to a trunk circuit for an exchange and more particularly to a trunk circuit for an exchange comprising conference trunks.

2. Description of the Prior Art

As is well known, the prior art exchanges have had a plurality of internal office trunks and some conference trunks therein. The internal office trunks and the conference trunks, however, were provided independently of each other, and the internal office trunks functioned only for their own operation. In the same way, the conference trunks were used only when a conference was held.

Therefore, when the conference trunks were not in use and requests for extension calls occurred, the conference trunks were not used at all, even if the quantity of the extension calls was more than the capacity of the internal office trunks.

Moreover, since it has been customary that the number of available connections to one conference trunk has usually been four or five, when a conference was held by more than six subscribers, it was impossible to use the conference trunk.

SUMMARY OF THE INVENTION

Accordingly, it is an object of the present invention to provide a novel and improved trunk circuit for an exchange, in which switching elements, coils and D.C. voltage supplies are provided in order to control the mutual connection of the internal office trunks and to operate the internal office trunks as conference trunks.

Another object of the present invention is to provide a new and improved trunk circuit which can be constructed in a more compact and efficient manner than the prior art exchange trunks.

Briefly, according to a preferred embodiment of this invention, there are provided first and second groups of internal office trunks. Each internal office trunk comprises first and second terminals for connecting two subscribers' telephones through a switching matrix circuit according to a demand signal from a central controller. The internal office trunks of the second group respectively further comprise a third terminal. The third terminal is connected to a switching circuit which is controlled by the central controller. The switching circuit operates so as to connect the desired number of third terminal lines with one another. As a result of being connected, the third terminal lines operate as a conference trunk.

BRIEF DESCRIPTION OF THE DRAWINGS

This invention can be more fully understood from the following detailed description when taken in conjunction with the accompanying drawings, in which.

DESCRIPTION OF THE PREFERRED EMBODIMENTS

Figure 1:
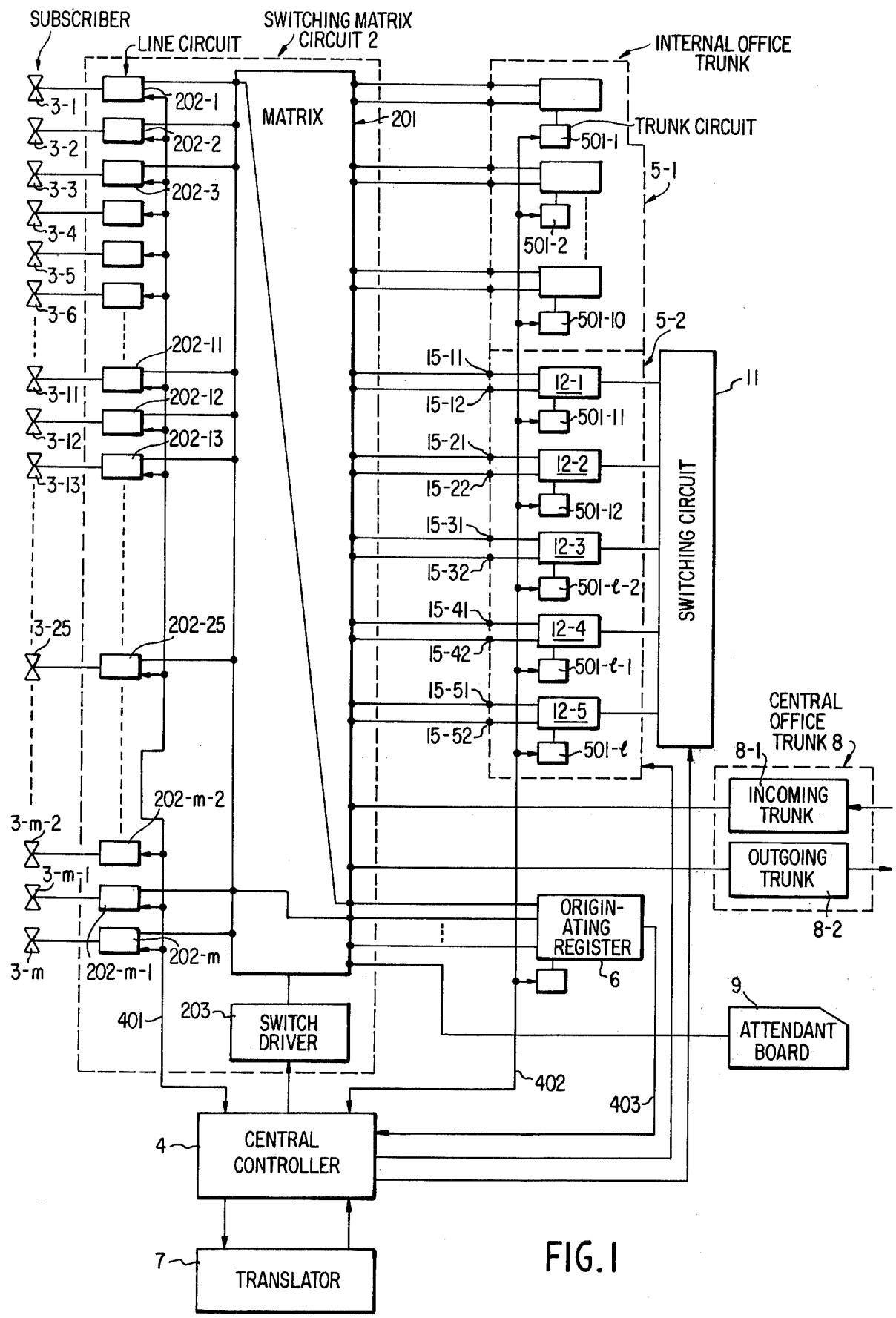
FIG. 1 is a block diagram showing an exchange including the trunk circuit of the present invention.

Referring now to the drawings, wherein like reference numerals designate identical or corresponding parts throughout the several views, as shown in FIG. 1, an exchange 1, such as a private branch-exchange or a private automatic branch-exchange, comprises a switching matrix circuit 2 containing a plurality of mechanical switches or a plurality of electronic switches. As is well known, the switching matrix circuit further comprises link circuits and trunk circuits therein so as to connect one of the subscribers' telephones 3-1 through 3-$m$ to another telephone appropriately. A central controller 4, such as a computer, controls the connection in the switching matrix circuit 2.

On the other hand, two groups of internal office trunks 5-1 and 5-2 are provided. Each group has a plurality of internal office trunks and two terminals of the respective internal office trunks are connected to the switching matrix circuit 2.

In such a system, when one of the telephones (for example telephone 3-1) requests an extension-call, a call number is transferred to a translator 7 through the central controller 4. The translator 7 translates the call number to the corresponding terminal number which is connected to the called telephone (for example telephone 3-5) and sends the translated terminal number to the central controller. The central controller 4 receives the terminal number from the translator 7, and controls the switching matrix circuit 2 so as to connect these two telephones through one of the vacant internal office trunks.

The exchange 1 should comprise a central office trunk 8 including an incoming trunk 8-1 and an outgoing trunk 8-2 for connecting the subscribers' telephones to city telephones. Numeral 9 shows an attendant board.

In addition to the above-mentioned system, a switching circuit 11 is provided in the present invention. The switching circuit 11 is connected to respective third terminals of the second group of internal office trunks 5-2, and operates so as to connect any of the third terminals mutually in accordance with control signals supplied from the central controller 4.

Figure 2:
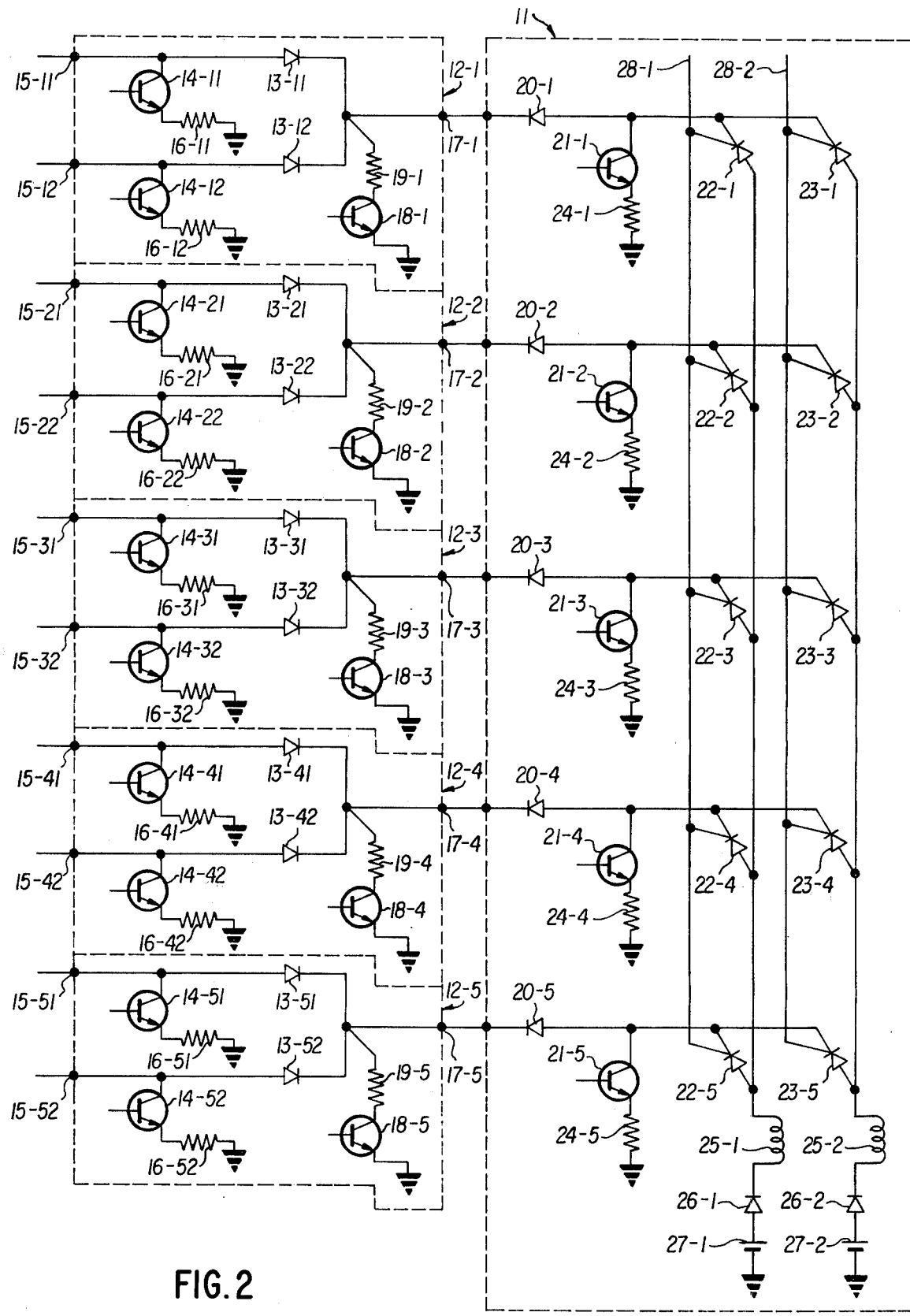
FIG. 2 is a circuit diagram showing a preferred embodiment of the trunk circuit of the invention.

FIG. 2 is a circuit diagram showing a preferred embodiment of the second group of internal office trunks 12-1, 12-2, 12-3, 12-4 and 12-5 and the switching circuit 11. In the internal office trunk 12-1, an anode of a diode 13-11 and a collector of a NPN transistor 14-11 are connected to the first terminal 15-11 thereof. In the same way, an anode of a diode 13-12 and a collector of a NPN transistor 14-12 are connected to the second terminal 15-12.

First and second terminals 15-11 and 15-12 are respectively connected to the switching matrix circuit 2 shown in FIG. 1. Emitters of transistors 14-11 and 14-12 are respectively grounded through resistors 16-11 and 16-12. Cathodes of diodes 13-11 and 13-12 are connected mutually, and an intermediate point of the connection is connected to the third terminal 17-1 of the internal office trunk 12-1.

The intermediate point of the connection is further connected to a collector of another NPN transistor 18-1 through a resistor 19-1. The emitter of the transistor 18-1 is grounded. In the same way, the other internal office trunks 12-2, 12-3, 12-4 and 12-5 respectively comprise NPN transistors 14-21 through 14-52, resistors 16-21 through 16-52, diodes 13-21 through 13-52, resistors 19-2 through 19-5 and NPN transistors 18-2 through 18-5.

In this way, each internal office trunk has three terminals, two connected to the switching matrix circuit 2 and other one connected to the switching circuit 11.

There are provided a plurality of diodes 20-1, 20-2, 20-3, 20-4 and 20-5 in the switching circuit 11. Cathode terminals of these diodes are respectively connected to the third terminals 17-1 through 17-5 of the internal office trunks 12-1 through 12-5. Anode terminals of respective diodes 20-1, 20-2, 20-3, 20-4 and 20-5 are connected to collectors of NPN transistors 21-1, 21-2, 21-3, 21-4 and 21-5, and are further connected to cathode terminals of a first group of thyristors 22-1, 22-2, 22-3, 22-4 and 22-5, and to a second group of thyristors 23-1, 23-2, 23-3, 23-4 and 23-5, respectively. Each emitter of the NPN transistors 21-1 through 21-5 is grounded through resistors 24-1 through 24-5.

Anode terminals of the first group of thyristors 22-1 through 22-5 are respectively connected to one terminal of a coil 25-1, and anode terminals of the second group of thyristors 23-1 through 23-5 are respectively connected to one terminal of another coil 25-2. Other terminals of the coils 25-1 and 25-2 are respectively grounded through series circuits including diodes 26-1 and 26-2 and D.C. voltage supplies 27-1 and 27-2, as shown in FIG. 2. The coils 25-1 and 25-2 are provided so as to prevent the passing of the high frequency voice current.

Each gate of the thyristors 22-1 through 22-5 is connected to a first control line 28-1, and each gate of the thyristors 23-1 through 23-5 is respectively connected to a second control line 28-2.

All base terminals of the transistors and the first and second control lines of the thyristors in FIG. 2 are connected to the central controller 4 shown in FIG. 1.

In the above-described circuit, when transistors 14-11 and 14-12 are turned on by the pulse signals supplied from the central controller 4 to the base terminals thereof, the D.C. voltage levels of the anode terminals of the diodes 13-11 and 13-12 are raised, because the circuit containing transistor 14-11 and resistor 16-11 and the circuit containing transistor 14-12 and resistor 16-12 respectively operates as a voltage supply.

It is easily understood that other trunks 12-2, 12-3, 12-4 and 12-5 also operate as internal office trunks in the same way as the trunk 12-1.

Subsequently, operation as a conference trunk is described considering two internal office trunks 12-2 and 12-3 as an example.

To begin with, the transistors 14-21 and 14-22 in the trunk 12-2 and the transistors 14-31 and 14-32 in the trunk 12-3 and the transistors 21-2 and 21-3 in the switching circuit 11 are turned on by the pulse signals supplied from the central controller. Thyristors 22-2 and 22-3 of the first group are then turned on by the gate signal supplied from the central controller. Lastly, transistors 18-2 and 18-3 in the trunks 12-2 and 12-3 are turned on by the pulse signal supplied from the central controller.

Consequently, two terminals 15-21 and 15-22 of the trunk 12-2 and two terminals 15-31 and 15-32 of the trunk 12-3 are all connected electrically, and the two trunks 12-2 and 12-3 can be used as a conference trunk.

Moreover, it is possible to connect the above-mentioned four terminals in the other order. Namely, the transistors 14-21, 14-22, 14-31 and 14-32 in the trunks 12-2 and 12-3 may be turned on first. Next, the transistors 18-2 and 18-3 in the trunks 12-2 and 12-3 may be turned on and the transistors 21-2 and 21-3 in the switching circuit 11 may then be turned on. Finally, thyristors 22-2 and 22-3 of the first group are turned on. In this case the four terminals 15-21, 15-22, 15-31 and 15-32 are connected after the two terminals 15-21, 15-22 and other two terminals 15-31, 15-32 are respectively connected with each other.

It is clear that the manner of connection among any desired number of terminals is also the same as described above. For example, when it is required to connect five terminals 15-11, 15-41, 15-42, 15-51 and 15-52 at the same time, gate signals are supplied to the transistors 14-11, 14-41, 14-42, 14-51 and 14-52, the transistors 21-1, 12-4 and 21-5 and the control line 28-1, in order to turn on these transistors as well as the thyristors 22-1, 22-4, and 22-5. Gate signals are then supplied to the transistors 18-1, 18-4 and 18-5.

On the other hand, when it is required to connect the six terminals 15-11, 15-12, 15-21, 15-22, 15-31 and 15-32, and it is also required to connect the four terminals 15-41, 15-42, 15-51 and 15-52, respectively, the control line 28-1 is used for the former group and the control line 28-2 is used for the latter group. In this case, it is possible to hold two conferences at the same time.

Connection of the above-described terminals will now be described by referring to the block diagram of FIG. 1.

As was stated previously, when there is an extension-call, the vacant internal office trunk is searched by the central controller. Now, suppose that the conference is being conducted among the subscribers' telephones 3-1, 3-3, 3-5, 3-6, 3-m-2 and 3-m, and the terminals 15-11, 15-12, 15-21, 15-22, 15-41 and 15-42 have been used for this conference. In this condition, if extension calls occur at the same time, it is possible to use the internal office trunks 12-3 and 12-5 which are not used for the conference even when all internal office trunks of the first group 5-1 are in use at that time. That is, when it is required to connect the telephone 3-2 to the telephone 3-m-1 after the internal office trunks of the first group 5-1 are in operation, it is possible to connect the two telephones by using the trunk 12-3 or 12-5.

On the other hand, suppose that all internal office trunks of the first group 5-1 and two trunks 12-3 and 12-5 of the second group are in operation (for extension calls) and the subscriber's telephone 3-1 is required to hold a conference with the telephones 3-3, 3-5, 3-6, 3-m-1 and 3-m. In this case, it is possible to hold the conference by using the tranks 12-1, 12-2 and 12-4. That is, in FIG. 2, transistors 14-11, 14-12, 14-21, 14-22, 14-41, 14-42, 21-1 and 21-4 are turned on, thyristors 22-1, 22-2 are also turned on, and lastly the transistors 18-1, 18-2 and 18-4 are turned on.

Since there are five internal office trunks in the second group as shown in FIGS. 1 and 2, it is possible to hold a conference among a maximum of 10 subscribers' telephones, and it is also possible to hold two conferences with six subscribers and four subscribers, separately. When there is no conference, five internal office trunks can be used in addition to the internal office trunks of the first group.

Figure 3:
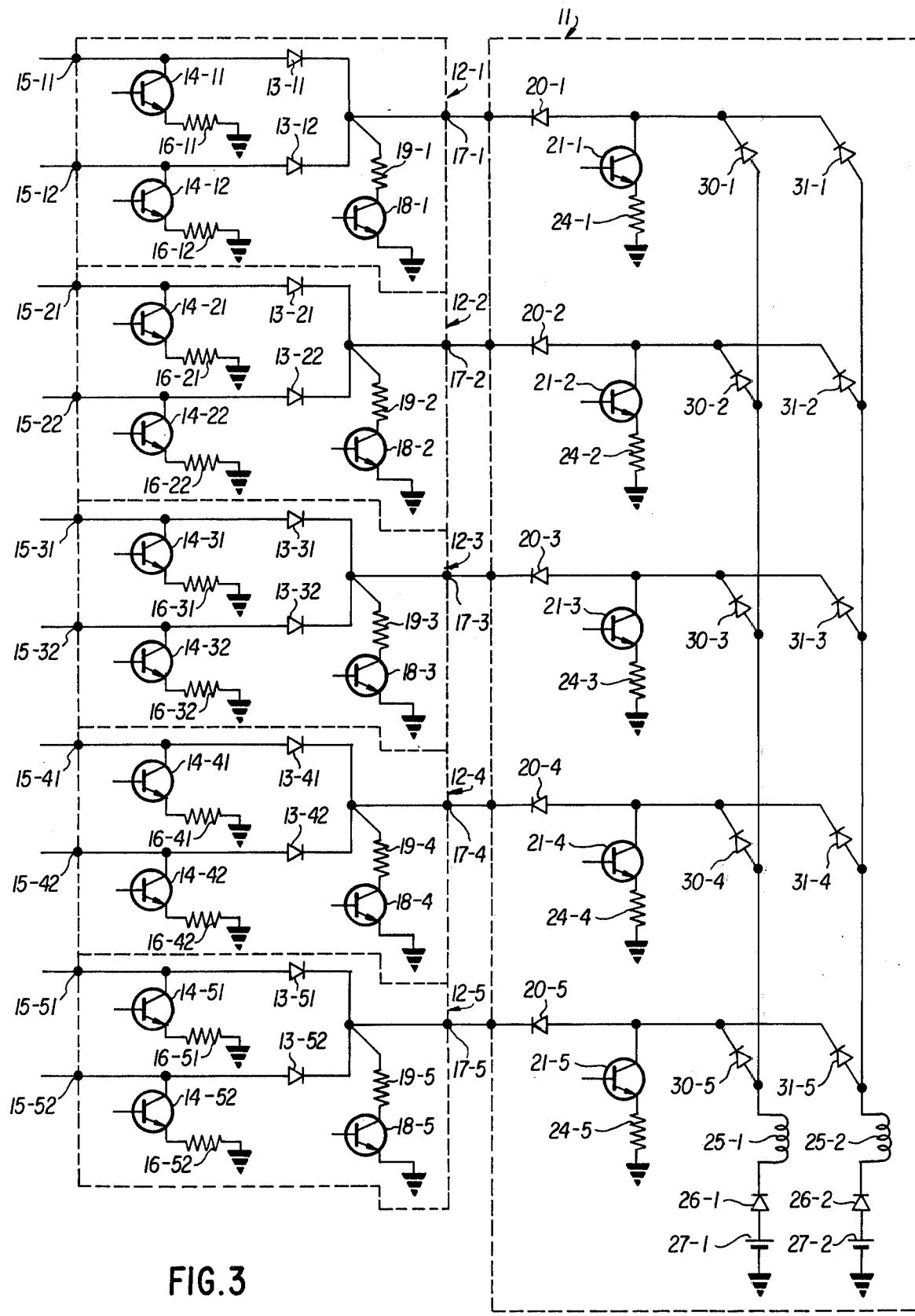
FIG. 3 is a similar circuit diagram showing another preferred embodiment of the trunk circuit of the invention; and, FIG. 4 is a block diagram showing another exchange system including the trunk circuit of the invention.

FIG. 3 shows another embodiment of the invention, wherein like reference numerals designate corresponding parts to FIG. 2. A plurality of PNPN diodes 30-1 through 30-5 and 31-1 through 31-5 are provided in the switching circuit 11. Anode terminals of the PNPN diodes are respectively connected to the coils 25-1 and 25-2, and cathode terminals are respectively connected to the collector terminals of the transistors 21-1 through 21-5. Each PNPN diode is automatically turned on when the corresponding transistor is turned on. Specifically, if the transistor 21-1 is turned on by the signal supplied from the central controller, the PNPN diodes 30-1 and 30-2 are automatically turned on. Accordingly, it is not required to provide any control lines such as the control lines for the thyristors.

Figure 4:
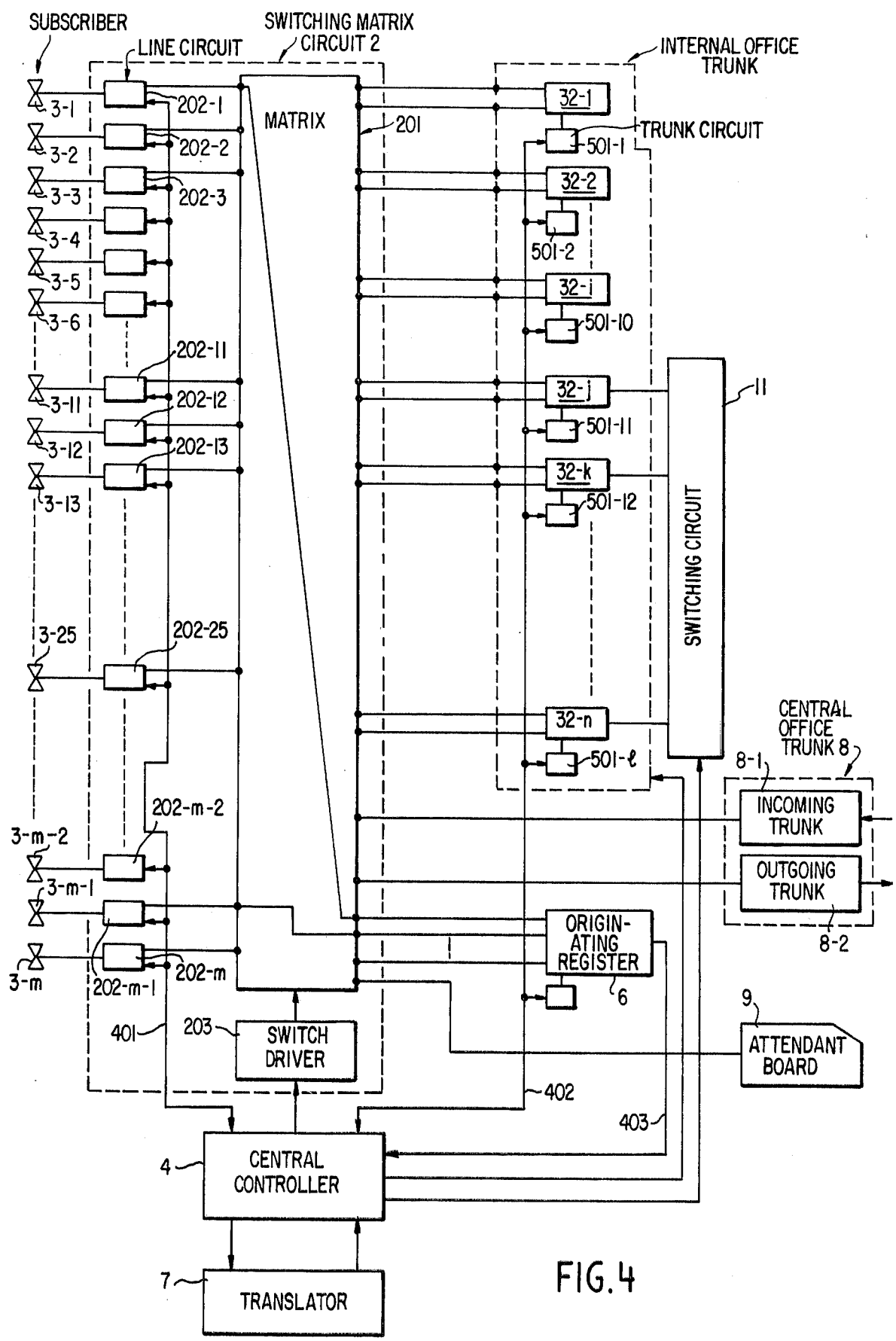

FIG. 4 shows another block diagram including the trunk circuit, wherein like reference numerals designate corresponding parts to FIG. 1. All internal office trunks 32-1 through 32-11 respectively have the third terminal which is connected to the switching circuit 11. The switching circuit 11 has the same construction as the circuit shown in FIG. 2, and the method of connecting these terminals is also the same as the method mentioned in FIG. 2.

According to the trunk circuit shown in FIG. 4, operation as an internal office trunk and operation as a conference trunk are entirely controlled by the switching circuit 11.

Referring to FIGS. 5–10, the operation of the exchange system of FIG. 1 will now be discussed in greater detail. In FIG. 1 and in FIG. 5, first of all, central processor 41 in central controller 4 supplies a scan signal to line circuits 202-1 to 202-m through line 401, and to the trunk circuits 501-1 to 501-1 through line 402. Actually, each line 401 and 402 is not single line but has many lines which are respectively connected to the line circuits 202-1 to 202-m and to the trunk circuits 501-1 to 501-l. The originating register 6 is a kind of trunk, and it can be said that the originating register 6 is one of the trunks which counts the dial number.

Figure 5:
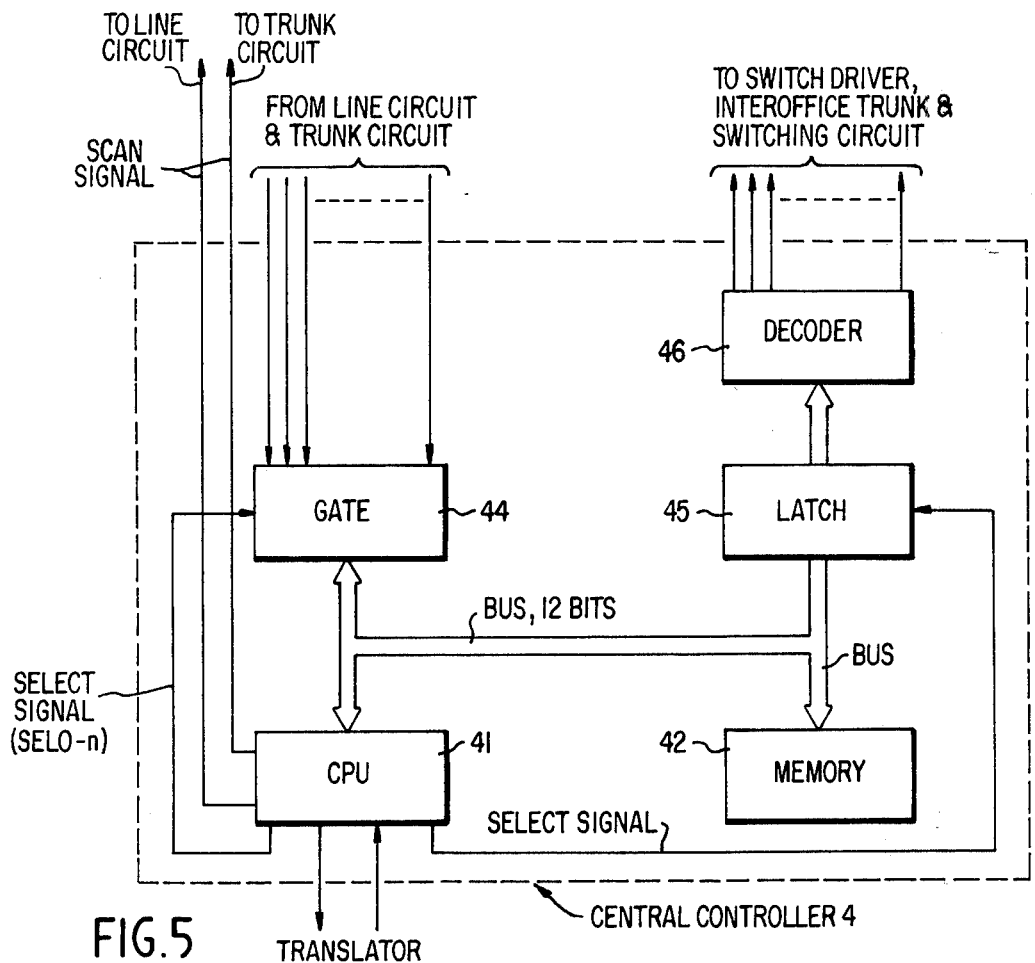
FIG. 5 shows the details of a central controller 4.
Figure 6:
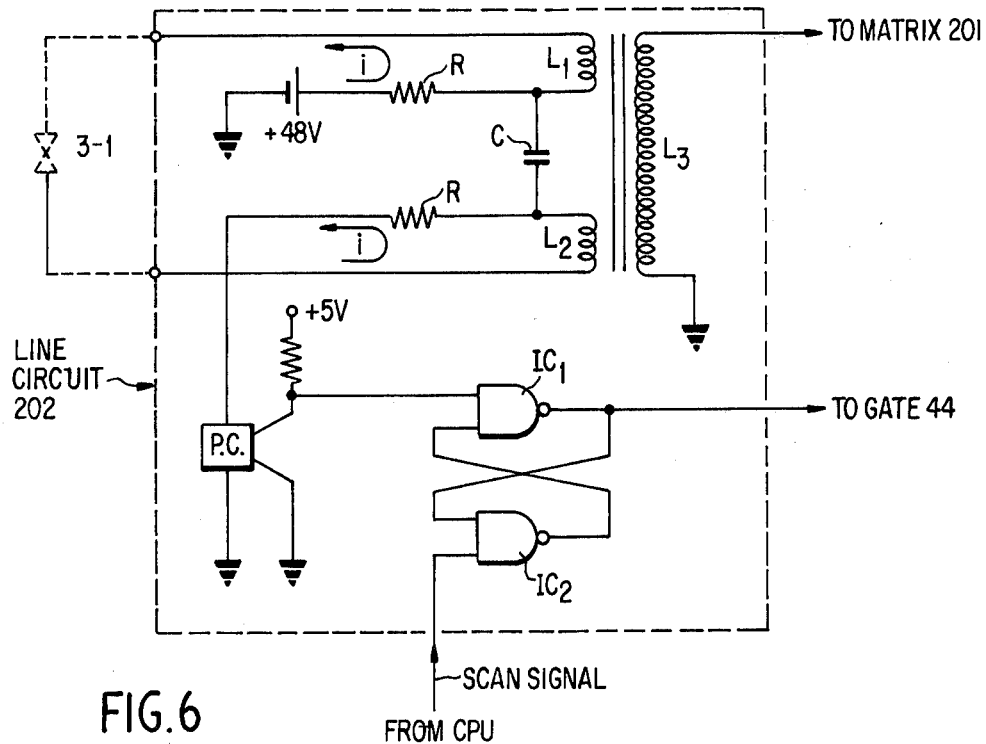
FIG. 6 shows the details of a line circuit 202.

Referring to FIG. 6, this scan signal is supplied to NAND gate IC$_2$. FIG. 6 shows the detail of one of the line circuits, i.e. this FIGURE shows line circuit 202-1, for example. Of course, the other line circuit 202-2 to 202-m respectively have the same structure. In FIG. 6, "PC" is a photo coupler, and numeral 61 shows a photo transistor. In this FIGURE, if the receiver of the subscriber 3-1 goes off-hook, current $i$ flows in the circuit. As a result thereof, this current $i$ flows in the photo coupler "PC". Then transistor 61 is turned on. So the voltage level of the input terminal of NAND gate IC$_1$ goes low, i.e. it becomes "0". During this time, if the scan signal is supplied to NAND gate IC$_2$ from the CPU 41, the voltage level of the output terminal of IC$_2$ goes high, i.e. it becomes "1". This high signal is then sent to gate 44 in FIG. 5.

As explained before, the scan signal is supplied to the trunk circuits 501-1 to 501- . These trunk circuits check the voltage level of the emitter terminal of the transistors 14-11, 14-21 — 14-51 shown in FIG. 2.

Figure 7:
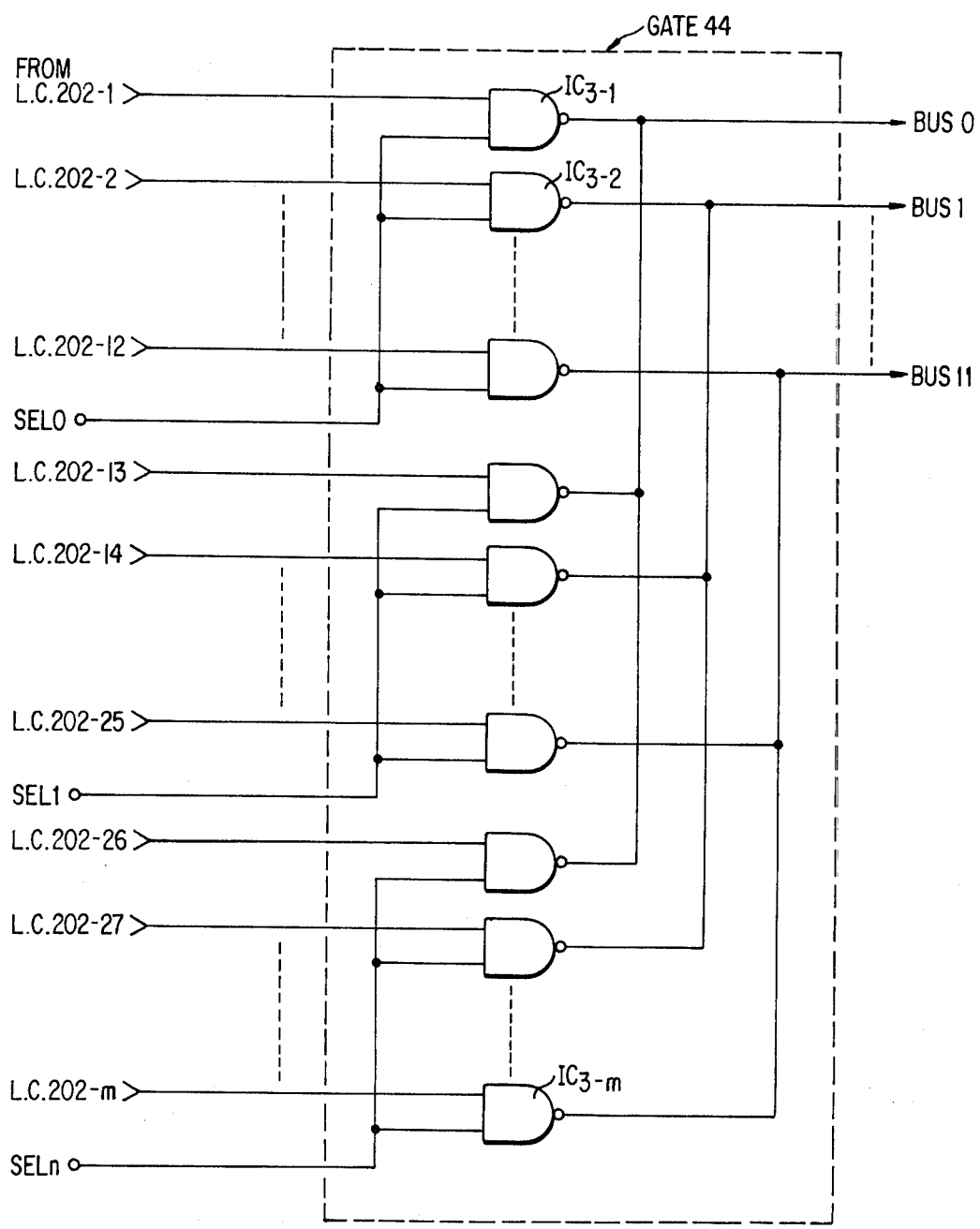
FIG. 7 shows the details of a gate 44.

In FIG. 5, a select signal is supplied to the gate 44 from the CPU 41. FIG. 7 shows the details of gate 44. In FIG. 7, if the signal, i.e. "1", is supplied to the terminal of SEL (=select)0 from the CPU 41, and at the same time, if the signal sent from the LC (=line circuit) 202-1 is "1", the voltage level of the output terminal of NAND gate IC 3-1 becomes "0". This signal "0" is sent to the BUS O. That is, if the BUS O is "0", that means the receiver of subscriber 3-1 has gone off-hook. In the same way, if the LC202-25 is "1" and if SEL is "1", BUS O becomes "0". In this case, if the BUS O is "0", this means the receiver of subscriber 3-25 has gone off-hook. In this way, CPU 41 is notified which subscriber's receiver has gone off-hook, and the terminal number corresponding to the subscriber whose receiver has gone off-hook is stored in the memory 42 in the central controller 4.

In the next step, the CPU 41 searches idle paths in the matrix 201 and idle originating register 6 and then the CPU 41 connects a subscriber, for example, subscriber 3-1 to the originating register 6, and then the CPU 41 sends a call number to the originating register 6. The CPU 41 receives this call number from the originating register 6 through a line 403 and sends it to the translator 7. The translator 7 translates this call number to the corresponding terminal number. That is, if subscriber 3-1 calls subscriber 3-$m$1, the translator 7 translates the call number to the terminal number of subscriber 3-$m$1. Then the CPU 41 operates in accordance with the information supplied from the memory 42.

Figure 8:
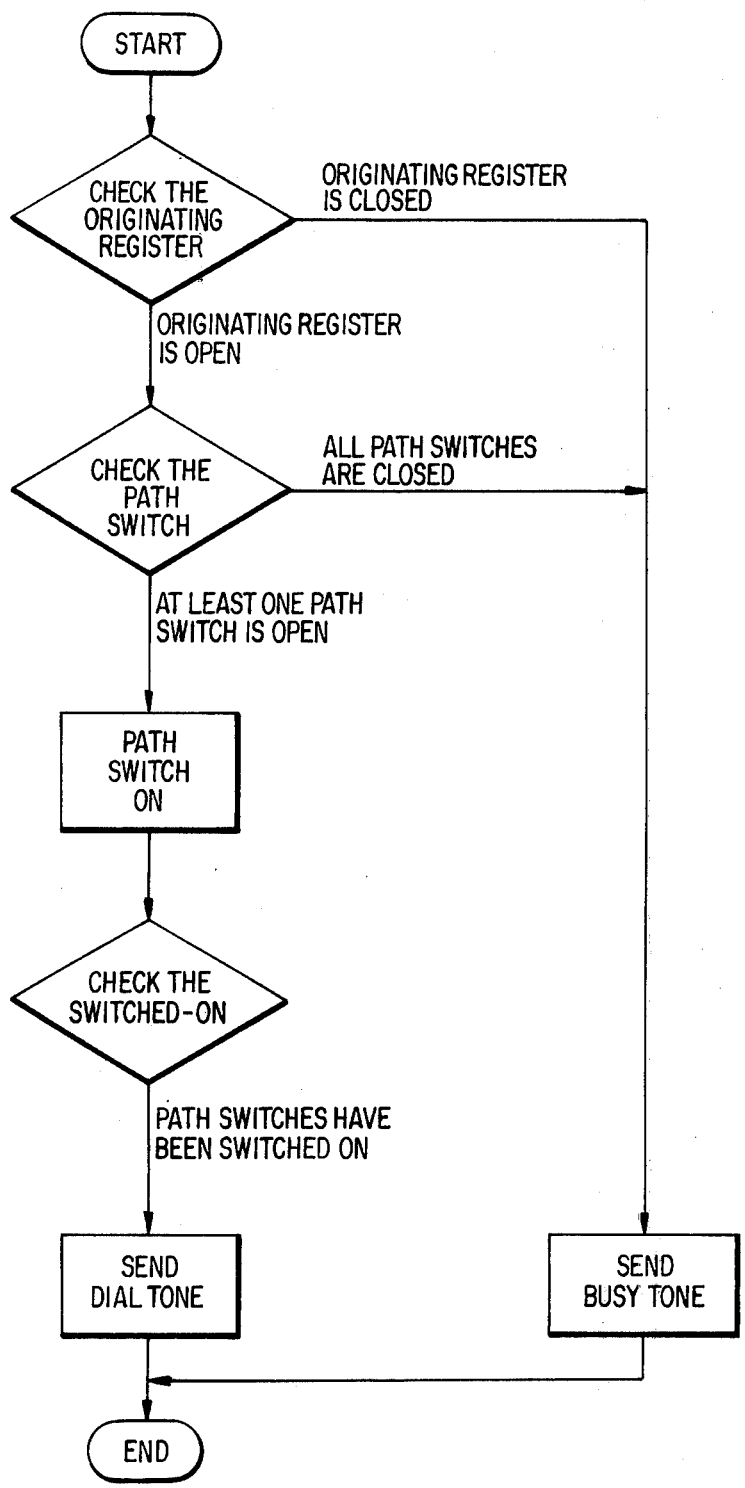
FIG. 8 is a flow chart to show how to operate the central controller to connect two subscribers.

FIG. 8 is a flow chart which shows the operation of the CPU 41. As shown in FIG. 8, first of all, the CPU 41 checks the situation of the originating register 6 and the internal office trunks. Namely, the CPU 41 checks whether or not the originating register 6 or the trunk circuit is idle. Of course the originating register 6 has a plurality of registers in it. So the CPU 41 checks whether there is at least one idle register in the originating register 6, and also checks whether there is at least one idle trunk in the internal office trunks. If there is at least one idle register in the originating register 6, the corresponding terminal number of the idle register is stored in the memory 42. Instead of this, the corresponding terminal number of the idle trunk in the internal office trunks can be stored in the memory 42, if there is at least one idle trunk in the internal office trunks.

Now suppose that the corresponding terminal number of the idle register is stored in the memory 42. Then the CPU 41 checks whether or not there are idle paths in the matrix 201 in order to connect the terminal corresponding to the idle register in the originating register 6 to the terminals corresponding to subscribers 3-1 and 3-$m$1. If there are idle paths in the matrix 201, this path information will be stored in the memory 42, and then the CPU 41 sends the command signal and the address signal to the latch 45. Namely, three kinds of address (the first one is a terminal number corresponding to the subscriber 3-1, the second one is a terminal number corresponding to the idle register in the originating register 6, and the third one is a path information) stored in the memory 42 are sent to the latch 45.

Figure 9:
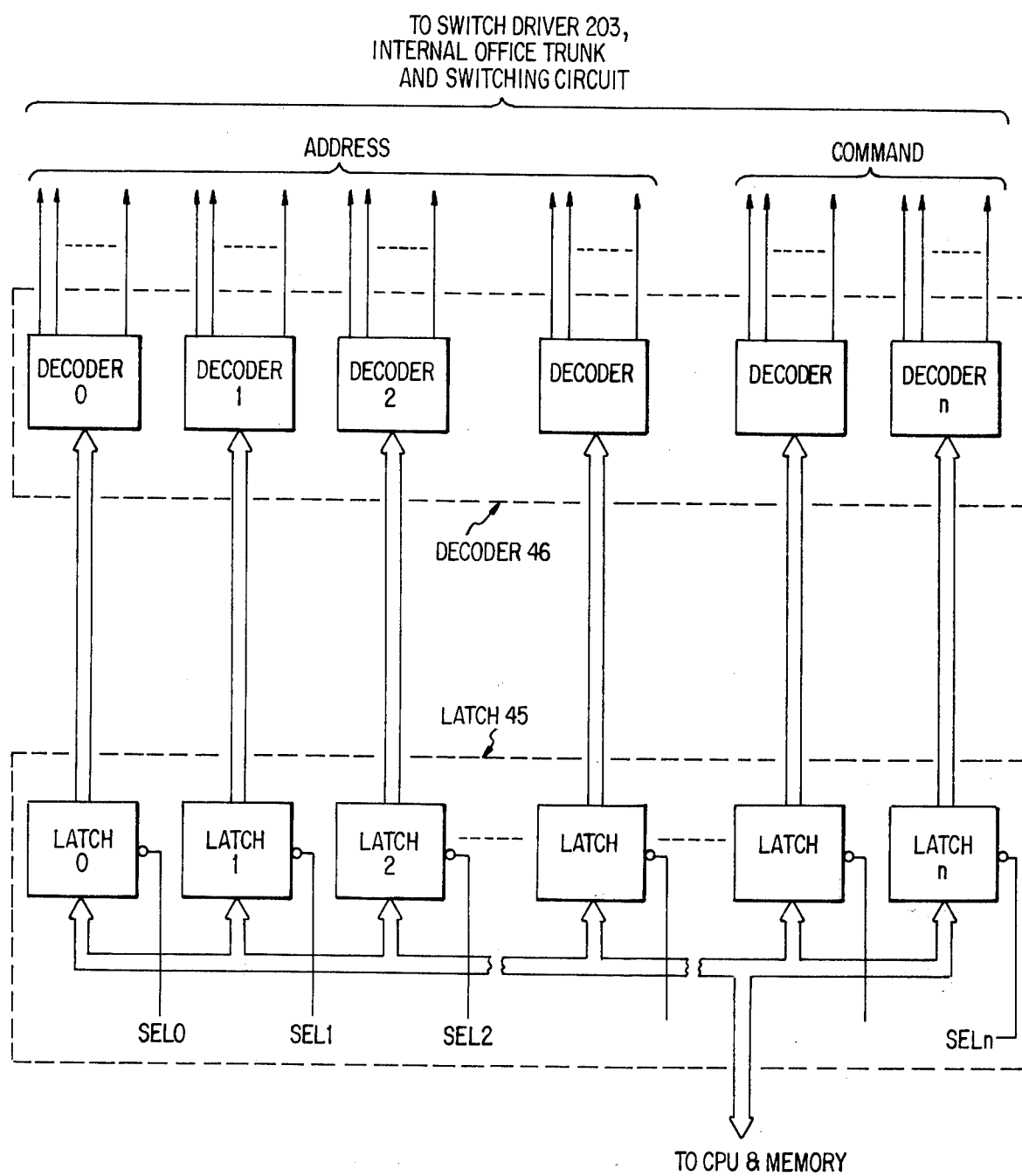
FIG. 9 shows the details of a latch 45 and a decoder 46.

Referring now to FIG. 9, the first address, i.e. the address which shows the terminal number corresponding to subscriber 3-1, is sent to the latch O, the second address, i.e. the address which shows the path information, is sent to the latch 1, and the third address, i.e. the address which shows the terminal number corresponding to the idle register in the originating register 6, is sent to the latch 2. Also, the command signal (which shows the command to switch on the necessary switches) is sent to latch n, for example. Selection of these latches is made by the select signal SEL o to SEL n supplied from the CPU 41. Then these address and command signals are sent to the decoder 46. The decoder 46 has $n+1$ decoders therein, i.e., decoders o to n. In these decoders, the address signal and the command signal are decoded. Then, these decoded signals are supplied to the switching driver 203 shown in FIG. 1. As a result, the path switches in the matrix 201 are switched on by the driver 203, and the terminal corresponding to subscriber 3-1 is connected to the terminal corresponding to subscriber 3-m1 through the terminal corresponding to the open register in the originating register 6, as shown in FIG. 1.

Referring again to FIG. 8, the CPU 41 then checks whether or not the path switches actually have been switched on. If it has been done appropriately, the CPU 41 supplies the command signal to send a dial tone (=call tone). (The generator of the dial tone is not shown in the Figures). As a result, a dial tone is sent to subscriber 3-m1. If there is no idle register in the originating register 6, and if there is no idle path switch in the matrix 201, a busy tone is sent to the subscriber 3-m1.

Now suppose that a conference is required. First of all, the CPU 41 knows that a certain subscriber (for example subscriber 3-1) is now requesting the conference call. Suppose that subscriber 3-1 calls subscribers 3-11, 3-13 and 3-25. The CPU 41 checks the total digits of the call number. If each extension number comprises 4 digits, and if 12 digits of the call number is sent from subscriber 3-1, the CPU 41 knows that the subscriber requests a four-person conference. Of course, this time also, the translator 7 translates these three call numbers to the corresponding terminal numbers. Then, the CPU 41 operates in accordance with the instructions supplied from the memory 42. These instructions are shown in FIG. 10.

Figure 10:
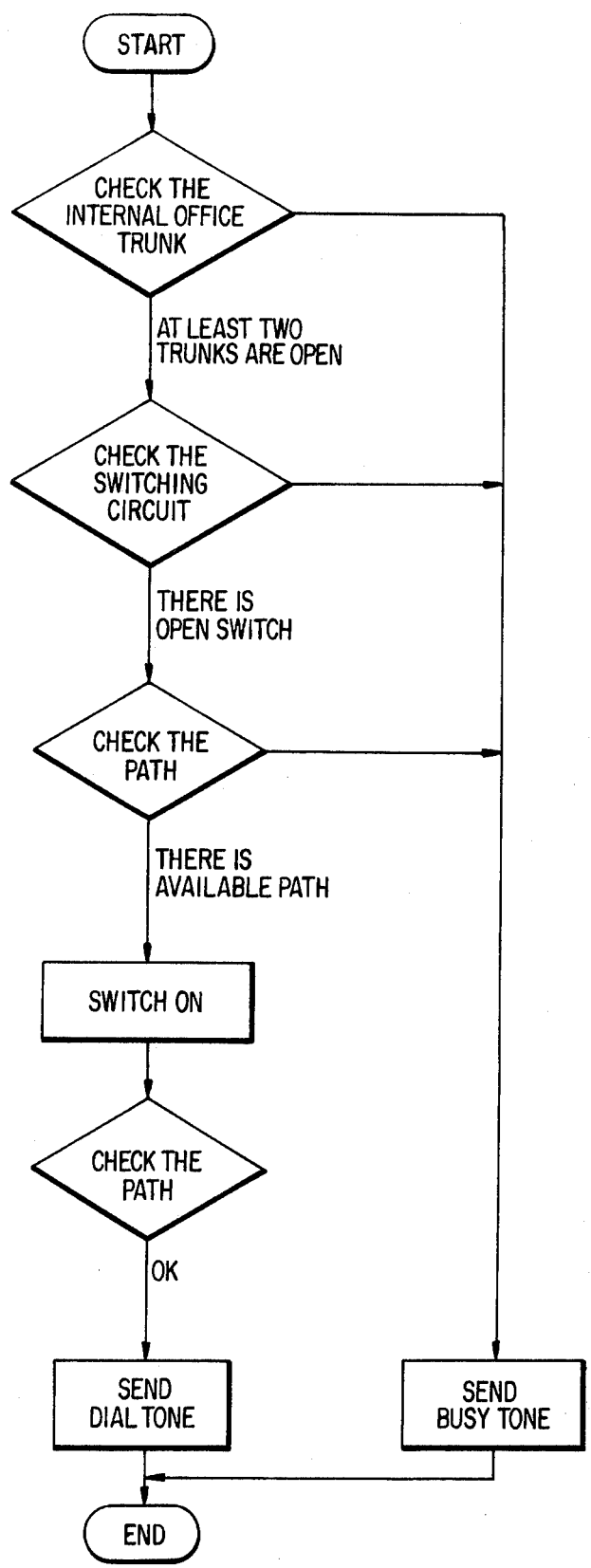
FIG. 10 is a flow chart to show how to operate the central controller for a conference call.

Referring now to FIG. 10, first of all, the CPU 41 checks whether or not there are at least two open trunks in the internal office trunks by sending scan signals to each trunk circuit through line 402. As explained before, the voltage level of the emitter terminals of the transistors 14-11, 14-21 — 14-51 shown in FIG. 2 can be used in order to check whether or not the trunk is idle. That is, if a certain trunk is idle, the voltage level of the emitter terminal of the transistor included in that internal office trunk is low, i.e. "0". So the CPU 41 can easily determine whether there are at least two idle trunks by checking the voltage level of the emitter terminal of each transistor in the internal office trunk. If there are two trunks which are idle, the numbers of six transistors in these two trunks are stored in the memory 42.

Suppose now transistors 14-11, 14-21, 14-12, 14-22, 18-1 and 18-2 are idle. Then the CPU 41 checks whether or not there is any available switch in the switching circuit 11. (However, if the transistors 14-11 and 14-21 in the internal office trunks are idle, the transistors 21-1 and 21-2 are also idle, as it has been explained before. Therefore, though this step is shown in FIG. 10, it is not actually necessary to check it). These transistors' numbers are stored in the memory 42. Then, the CPU 41 checks whether or not there are idle switch paths in the matrix 201 in order to connect the terminal corresponding to subscriber 3-1 to three terminals respectively corresponding to the called subscribers 3-11, 3-13 and 3-25 through the idle internal office trunks. If there are idle paths, this path information is also stored in the memory 42.

Then the CPU 41 sends a command signal and the address signal to the decoder 46 through the latch 45. As a result thereof, in the same way as explained before, the decoded signals are supplied to the switching driver 203 in FIG. 1, to the base terminals of the transistors 14-11, 14-12, 14-21, 14-22, 18-1 and 18-2 in the internal office trunks and to the base terminals of the transistors 21-1 and 21-2 in the switching circuit 11 and to the line 28-1 in FIG. 2. In this way transistors 14-11, 14-12, 14-22, 21-1 and 21-2 are turned on, thyristors 22-1 and 22-2 are also turned on, and transistors 18-1 and 18-2 are also turned on. As a result, the subscriber 3-1 is connected to subscribers 3-11, 3-13 and 3-25 through the internal office trunks 12-1 and 12-2 and the switching circuit 11.

Referring again to FIG. 10, the CPU 41 then sends a command signal to send a dial tone to the called subscribers.

If there are not two idle internal office trunks, or there is no idle switch in the switching circuit 11, or there are no idle paths in the matrix 201, the CPU 41 sends a command signal to send a busy tone to the called subscribers.

Obviously, numerous modifications and variations of the present invention are possible in light of the above teachings. It is to be understood therefore that within the scope of the appended claims the invention may be practiced otherwise than as specifically described herein.

What is claimed as new and desired to be secured by letters patent of the United States is:

1. A trunk circuit for an exchange comprising:
   a plurality of subscribers' telephones,
   a plurality of internal office trunks for electrically connecting two subscribers' telephones with each other, each of the internal office trunks having first, second and third terminals,
   a switching matrix circuit for electrically connecting the subscribers' telephones to the internal office trunks, the switching matrix circuit having a first plurality of terminals and a second plurality of terminals,
   a switching circuit for electrically mutually connecting a desired number of the third terminals of the plurality of internal office trunks, the switching circuit having a plurality of terminals,
   a central controller for controlling internal connections of the switching matrix circuit, in the plurality of internal office trunks and in the switching circuit,
   means connecting the subscribers' telephones to the first plurality of terminals of the switching matrix circuit,
   means connecting the second plurality of terminals of the switching matrix circuit to the first and second terminals of the plurality of internal office trunks,
   means connecting the third terminals of the plurality of internal office trunks to the plurality of terminals of the switching circuit,
   means connecting the central controller to the switching matrix circuit, and
   means connecting the central controller to the switching circuit,
   each internal office trunk comprising:
   a first transistor,
   a second transistor, a third transistor,
a first diode,
a second diode,
a first resistor,
a second resistor,
a third resistor,
means connecting the first terminal of the internal office trunk to the collector of the first transistor,
means connecting the second terminal of the internal office trunk to the collector of the second transistor,
means connecting the first resistor between ground and the emitter of the first transistor,
means connecting the second resistor between ground and the emitter of the second transistor,
means connecting the collector of the first transistor to the anode of the first diode,
means connecting the collector of the second transistor to the anode of the second diode,
means connecting the cathode of the first diode and the cathode of the second diode to the third terminal of the internal office trunk,
means connecting the third resistor between the third terminal of the internal office trunk and the collector of the third transistor,
means connecting the emitter of the third transistor to ground,
means connecting the base of the first transistor to the central controller,
means connecting the base of the second transistor to the central controller, and
means connecting the base of the third transistor to the central controller.

2. A trunk circuit for an exchange in accordance with claim 1 wherein the switching circuit comprises:
a plurality of diodes,
a plurality of transistors,
a plurality of resistors,
a first control line,
a first group of thyristors,
a second control line,
a second group of thyristors,
a first coil,
a first diode,
a first voltage supply,
a second coil,
a second diode,
a second voltage supply,
means respectively connecting the cathodes of the plurality of diodes to the third terminals of the internal office trunks,
means respectively connecting the anodes of the plurality of diodes to the collectors of the plurality of transistors and to the cathodes of the first group of thyristors and to the cathodes of the second group of thyristors,
means respectively connecting the plurality of resistors between ground and the emitters of the plurality of transistors,
means respectively connecting the gates of the first group of thyristors to the first control line,
means respectively connecting the gates of the second group of thyristors to the second control line,
means connecting the first coil between a common connection of the anodes of the first group of thyristors and the cathode of the first diode,
means connecting the second coil between a common connection of the anodes of the second group of thyristors and the cathode of the second diode,
means connecting the first voltage supply between the anode of the first diode and ground,
means connecting the second voltage supply between the anode of the second diode and ground,
means respectively connecting the central controller to the bases of the plurality of transistors,
means connecting the first control line to the central controller, and
means connecting the second control line to the central controller.

3. A trunk circuit for an exchange in accordance with claim 1 wherein the switching circuit comprises:
a plurality of diodes,
a plurality of transistors,
a plurality of resistors,
a first group of PNPN transistors,
a first coil,
a first diode,
a first voltage supply,
a second group of PNPN transistors,
a second coil,
a second diode,
a second voltage supply,
means respectively connecting the cathodes of the plurality of diodes to the third terminals of the internal office trunks,
means respectively connecting the anodes of the plurality of diodes to the collectors of the transistors and to the cathodes of the first and second groups of PNPN transistors,
means respectively connecting the plurality of resistors between ground and the emitters of the plurality of transistors,
means connecting the first coil between a common connection of the anodes of the first group of PNPN transistors and the cathode of the first diode,
means connecting the first voltage supply between ground and the anode of the first diode,
means connecting the second coil between a common connection of the anodes of the second group of PNPN transistors and the cathode of the second diode,
means connecting the second voltage supply between the anode of the second diode and ground, and
means respectively connecting the bases of the plurality of transistors to the central controller.

* * * * *